United States Patent
Hovind et al.

(10) Patent No.: US 6,433,689 B1
(45) Date of Patent: Aug. 13, 2002

(54) SYSTEM FOR SUPERVISION AND CONTROL OF OBJECTS OR PERSONS

(75) Inventors: Ole B. Hovind, Oslo; Eric Sandmol, Stavern, both of (NO)

(73) Assignee: Filetrac AS, Oslo (NO)

( * ) Notice: Subject to any disclaimer, the term of this patent is extended or adjusted under 35 U.S.C. 154(b) by 0 days.

(21) Appl. No.: 09/673,345
(22) PCT Filed: Apr. 16, 1999
(86) PCT No.: PCT/NO99/00124
§ 371 (c)(1),
(2), (4) Date: Jan. 12, 2001
(87) PCT Pub. No.: WO99/55057
PCT Pub. Date: Oct. 28, 1999

(30) Foreign Application Priority Data

Apr. 16, 1998 (NO) ............................................. 981723

(51) Int. Cl.$^7$ .............................................. G08B 23/00
(52) U.S. Cl. ................................ 340/573.1; 340/573.4; 340/573.3; 340/568.1; 340/571; 340/531; 340/825.01; 340/3.1; 340/3.21; 340/7.27; 340/825.49; 340/10.2; 340/10.31; 340/10.32; 340/572.1; 367/197; 367/199; 367/117; 367/93; 455/422; 455/462; 455/464; 705/32
(58) Field of Search .......................... 340/573.1, 573.4, 340/573.3, 568.1, 571, 539, 531, 825, 825.01, 3.1, 3.21, 2.1, 2.71, 2.7, 5.21, 5.22, 5.27, 5.32, 5.33, 5.5, 5.3, 825.4, 7.27, 7.29, 825.49, 10.2, 10.31, 10.32, 457, 457.4, 309.15, 572.1, 540; 367/197, 199, 117, 93; 342/44; 455/422, 462, 464; 705/32

(56) References Cited

U.S. PATENT DOCUMENTS

| | | | | |
|---|---|---|---|---|
| 3,696,384 A | * | 10/1972 | Lester .......................... 367/199 |
| 4,225,953 A | * | 9/1980 | Simon et al. ................. 367/117 |
| 4,275,385 A | * | 6/1981 | White .................... 340/825.49 |
| 4,367,458 A | * | 1/1983 | Hackett ....................... 340/539 |
| 4,549,264 A | * | 10/1985 | Carroll et al. ................. 705/32 |
| 4,602,357 A | * | 7/1986 | Yang et al. .................... 367/93 |
| 4,630,035 A | * | 12/1986 | Stahl et al. .................. 340/539 |
| 4,675,656 A | | 6/1987 | Narcisse ...................... 340/539 |
| 4,686,513 A | * | 8/1987 | Farrar et al. ................. 340/571 |
| 4,731,814 A | * | 3/1988 | Becker et al. ............... 455/411 |
| 4,955,000 A | * | 9/1990 | Nastrom ...................... 367/117 |
| 5,051,741 A | * | 9/1991 | Wesby .................... 340/825.49 |
| 5,062,151 A | * | 10/1991 | Shipley ....................... 359/154 |
| 5,218,344 A | * | 6/1993 | Ricketts ................... 340/573.4 |
| 5,245,317 A | | 9/1993 | Chidley et al. ............. 340/571 |
| 5,311,185 A | * | 5/1994 | Hochstein et al. ............. 342/44 |
| 5,426,425 A | * | 6/1995 | Conrad et al. .......... 340/825.49 |
| 5,543,797 A | * | 8/1996 | Hochstein et al. .......... 340/10.2 |
| 5,640,144 A | | 6/1997 | Russo et al. .............. 340/568.1 |
| 5,708,423 A | * | 1/1998 | Ghaffari et al. .............. 340/5.8 |
| 5,798,694 A | * | 8/1998 | Reber et al. ................. 340/540 |
| 5,838,234 A | * | 11/1998 | Roulleauz-Robin ...... 340/572.3 |
| 5,936,527 A | * | 8/1999 | Isaacman et al. ......... 340/572.1 |

FOREIGN PATENT DOCUMENTS

| | | |
|---|---|---|
| EP | 8403975 | 10/1984 |
| EP | 9325984 | 12/1993 |
| EP | 9502874 | 1/1995 |

* cited by examiner

Primary Examiner—Benjamin C. Lee
(74) Attorney, Agent, or Firm—Baker Botts L.L.P.

(57) ABSTRACT

A system for supervision and control of objects or persons within a limited area, such as a building, comprising a plurality of electronic identification chips for placing on respective objects/persons to be supervised/controlled, each chip having stored therein a special ID code and being provided with respective transmitters and receivers for communication via ultrasound as well as audible sound, a plurality of stationary detectors which are interconnected in a network and arranged for both-way communication with the chips, and a central control unit in communication with the chips via the detectors. Each chip is continuously active in operation and is arranged to transmit its ID code at predetermined time intervals. At least one of the detectors or the control unit are being arranged to trigger an alarm unit if an incorrect code is received or an approved code is not received continuously at predetermined time intervals.

14 Claims, 8 Drawing Sheets

SYSTEM FOR SUPERVISION AND CONTROL OF OBJECTS OR PERSONS

The invention relates to a system for supervision and control of objects or persons within a limited area, such as a building, comprising a plurality of electronic identification chips for placing on respective objects/persons to be supervised/controlled, each chip having stored a special ID code and being provided with a transmitter and a receiver for communication via ultrasound, a plurality of stationary detectors interconnected in a network and arranged for both-way communication with the chips, and a central control unit communicating with the chips via the detectors.

There is previously known a system of the above-mentioned type which is constructed for localizing persons by means of individual badges or marker chips, and wherein the system is based on signalling by means of ultrasound. In this known system the badges have an ultrasonic signature which is extractable by means of special ultrasonic sensors mounted in walls or ceilings in e.g. a building, and wherein the sensors constitute a transceiver which is able to transmit and receive an ultrasonic signal over a distance range of up to 10 m. The system comprises a control unit communicating with the badges via said sensors. When a badge is situated in the communication region of a sensor, the control unit stores the identification number of the badge, the identification of the sensor encountering the badge, and date and time for the coincidence. This information is transmitted in coded form by means of ultrasound to a central control unit in the form of e.g. a computer or PC.

A substantial weakness of the previously known system is that signalling with ultrasound is dependent on a free visibility between the marked object and the current sensor or detector, or a high degree of saturation of the localization area with ultrasound from a large number of transmitters. In order to remedy this weakness, some systems have added signalling by means of radio signals. However, this creates problems for electronically sensitive equipment.

The above-mentioned known system neither can be used in another important field of application, viz. with active supervision and control of objects, persons etc. within a complex of buildings, a building or parts of a building. Such supervision and control is of substantial importance within many fields of the society. As examples there may be mentioned hospitals and other health institutions, insurance companies, factories, laboratories, air ports, banks, military installations, guard companies, hotels, offices, shops, dwellings, etc.

A problem or a weakness with the known systems for access and movement control, is that they are switched off when authorized personnel is within the supervised or controlled area. This implies that also other persons can get into and/or move freely within the same area without an alarm being triggered. Thus, within the same system, there is not distinguished between access control and the number of persons that can move (authorized or non-authorized movements) after having passed the access control. This means reduced security and reduced survey/control. The same otherwise applies to private dwellings where unauthorized persons seek entry with the intention of profit while persons are present, because a possible alarm then is switched off.

Another weakness of the existing systems is the lacking safety of authorized personnel. As a consequence of the fact that the alarms in most cases are switched off after adequate admission through coded, electronic or other control systems, unauthorized persons can—when the alarm is switched off—easily move within such areas if they have obtained access to forbidden zones. Dangerous situations and unsafe working places thereby arise, especially in the evening and at night. There are many examples of personnel in such situations having been assaulted by thieves or drug addicts in desperate pursuit of narcotics, cf. hospitals. Especially, existing systems manage badly in large institutions having a large personnel traffic, such as applies to hospitals, military quarters, banks, etc. Especially the unsafety of the personnel increases from daytime to afternoon, evening and night.

An additional weakness or drawback of the existing systems is that they only to a small extent allow differentiation of the alarm generation in the effected access/movement control. For example, traffic in a hospital corridor or a transport conduit will be able to give alarm with any movement, or no alarm at all when access authorization has been obtained.

In active supervision and control of objects it is often also important to be able to provide for routine maintenance of equipment which has to be taken in for control and testing after given time periods. In some cases it is also the total operating time of the equipment which is the criterion for calling in for control and testing.

There exist data systems with software which takes care of routine maintenance of said type. The location of the equipment of interest then is generally recorded in a central computer. The drawback of these known systems is that they do not automatically manage to locate equipment which is moved, and that they therefore require use of time and resources from personnel to recover such mobile equipment or tools. Equipment which is only to be used a given number of operating hours, will also require much resource use and severe demands on human routines in that personnel physically must check and keep control over the operating time. Common to the known systems is that they are based on a great administrative work with the effort of considerable labour, careful and accurate registrations of equipment and operating time, and running maintenance programs. These operations have in common that a great discipline from many people is required, something which often fails and involves a need for a great effort of labour. Seeking is perceived as unnecessary trouble and delay, and therefore results. in a poorer working environment and a great turnover of personnel.

On this background it is an object of the invention to provide a flexible and programmable system which provides for access and movement control of persons, objects and documents within a complex of buildings, a building or parts of a building, at the same time as the above-mentioned weaknesses/drawbacks are avoided, so that authorized personnel can move freely within the topical area while an alarm will be given if unauthorized persons get into the same area.

The above-mentioned object is achieved with a system of the introductorily stated type which, according to the invention, is characterized in that each chip and each detector also is provided with a transmitter and a receiver for communication via audible sound (audio), a means being provided for switching between ultrasonic and audio communication, and that each chip in operation is continuously active and is arranged to transmit its ID code at predetermined time intervals, the detector or the control unit being arranged to trigger an alarm unit if an incorrect code is received or an approved code is not received continuously at chosen time intervals.

In the system according to the invention authorized personnel is equipped with an active ID chip with both-way wireless ultrasonic and audio communication and having a special ID code for the person carrying the chip. In case of entry into an area requiring authorization, the system will recognize the chip and fail to give an alarm. This takes place in that the chip at a preprogrammed time interval gives a coded message to detectors placed around in relevant areas that it is present and is authorized. The detectors, which may either be a separate self-contained unit or a subcomponent in a superior central system, will verify the ID code emitted by the chip. Chips emitting codes which are not in accordance with allowed codes, will cause activation of the alarm system, locally or centrally. This takes place in that a number of stationary detectors, which are interconnected in a network and are arranged for both-way communication with the chips, and a main central or subcentral communicating with the chips via the sensors/detectors and possible repeaters, will activate the alarm system. Similarly, unauthorized persons without such chips will do the same in that they enter into zones covered by detectors. These detectors are constructed for reacting both to ultrasonic and audio signalling and also to movement within their area. The principle of detection of movement may be both infrared radiation (IR) and ultrasound, or other known principles.

A further object of the invention is to provide a system providing for calling and localization of objects and equipment, for example in connection with automatic call-in to routine or operational maintenance of equipment which must be brought in for control and testing after given time periods.

This object is achieved with a system of the introductorily stated type which, according to the invention, is characterized in that each chip and each detector also is provided with a transmitter and a receiver for communication via audible sound (audio), a means being provided for switching between ultrasonic and audio communication, and that the central control unit is arranged to selectively call a chosen chip via the detectors, and that the chips are arranged to give an answer as a reaction to the call, the closest situated detector then identifying the site/locality of the chip.

In the above stated system the central control unit will, in case of a requirement for routine maintenance of equipment, automatically give a message to the detectors which in turn will call the relevant marker or ID chip. The chip will respond, and the detector which is closest, will give a message, and since a detector is stationary, the location is defined within the communication distance between the chip and the detector. The chips also have the possibility to activate themselves after a preprogrammed time interval. If some equipment has a requirement for test and control after a certain number of hours of operation, the chip may contain inputs registering the length of active operating time having elapsed at any time, and give a return message to the central control unit. The advantage which is achieved, is that one has an automatic system which does not need to pay regard to human routines in that personnel physically must check and keep control over the operating time and the errors which may normally arise in this connection. Further, the system is very resource-saving in that all the time one has control from a central location of where equipment is located, and then especially portable/movable equipment.

A substantial advantage of the system according to the invention is that it does not "contaminate" the environment within the range of application of the system with electromagnetic fields which may disturb electromagnetically sensitive equipment. This is of substantial importance, for example in a hospital environment.

A field of application wherein the system according to the invention will be very advantageous, is in retrieval of journals (patient journals) and equipment in hospitals. In this connection the combination of sound and ultrasound will increase the detection from about 60% when using only ultrasound to 100% with sound. The combination is both important and advantageous, as audio communication is introduced only when one does not find "the target object" with detection of ultrasound alone. Thereby on avoids "contamination" of the environment to a too great extent. Possibly one may also use audio communication in an updating of the location of all the topical objects (patient journals) at certain times of the day, for example evening and/or morning.

Thus, the system provides a safe retrieval of journals and equipment, provided the relevant rooms have got a detector installed. This means that it is not necessary to have free lines of sight to the objects of interest, or to saturate large areas with ultrasound by means of many wave generators. Ultrasound is easily stopped by physical obstacles, such as paper. Safe detection therefore would require a system which could also pick up ultrasonic waves reflected from walls, objects, etc., something which is technically difficult and would result in a more expensive solution. This is the reason why the problem with retrieval of journals and equipment in confined rooms has not previously been solved in a satisfactory manner. As mentioned above, some systems have added RF communication. However, the limitation to rooms then will not be sufficiently accurate without the help of large number of aerials, and at the same time one gets undesired electromagnetic fields.

The system according to the invention also provides automated maintenance routines with indication of the place where the equipment is located, something which gives large possibilities for rationalization profits in relation to the systems of today, especially when it is the question of portable or movable equipment.

The invention will be further described below in connection with exemplary embodiments with reference to the drawings, wherein FIG. 1 shows a survey view of a system according to the invention, installed in a number of rooms in a supervised area of a building;

Figure 1:
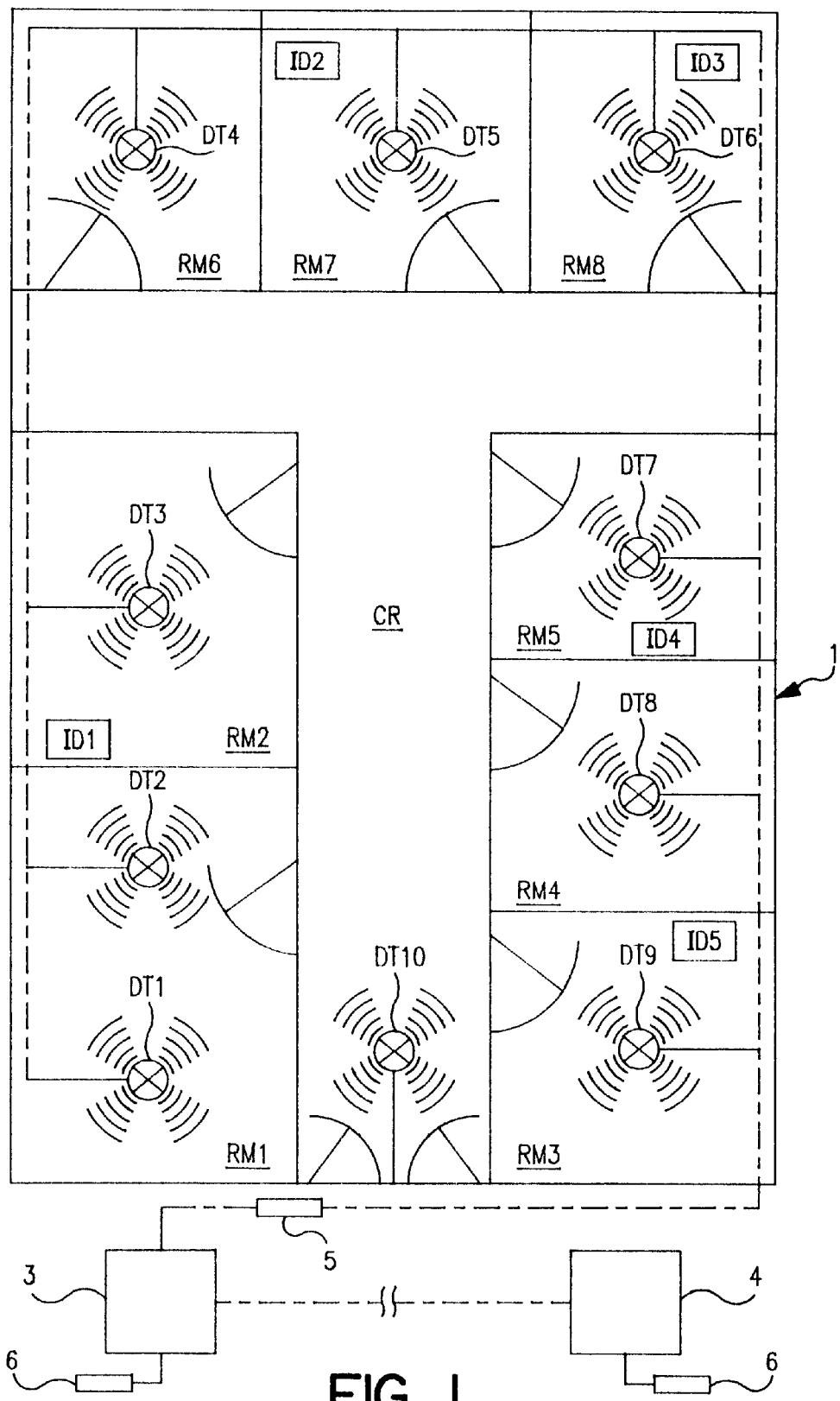

In FIG. 1. a floor area 1 of a building is shown to be divided into eight rooms RM1–RM8, and a passage or corridor CR arranged between the rooms. In the rooms and in the corridor there are mounted a number of detectors DT1–DT10, more specifically two detectors in a room RM1 and one detector in each of the remaining rooms RM2–RM8 and in the corridor CR. Further, marker or ID chips are situated in some of the rooms, more specifically respective chips ID1–ID5 in the rooms RM2, RM7, RM8, RM5 and RM3. All the detectors are connected to a network 2 which, in the illustrated example, is in connection with a pair of central control units, more specifically a subcentral 3 and a main central 4. In the network there is also shown to be connected a repeater 5, i.e. a unit for amplifying the signals in the network. Further, the centrals are in connection with alarm units 6.

Figure 2:
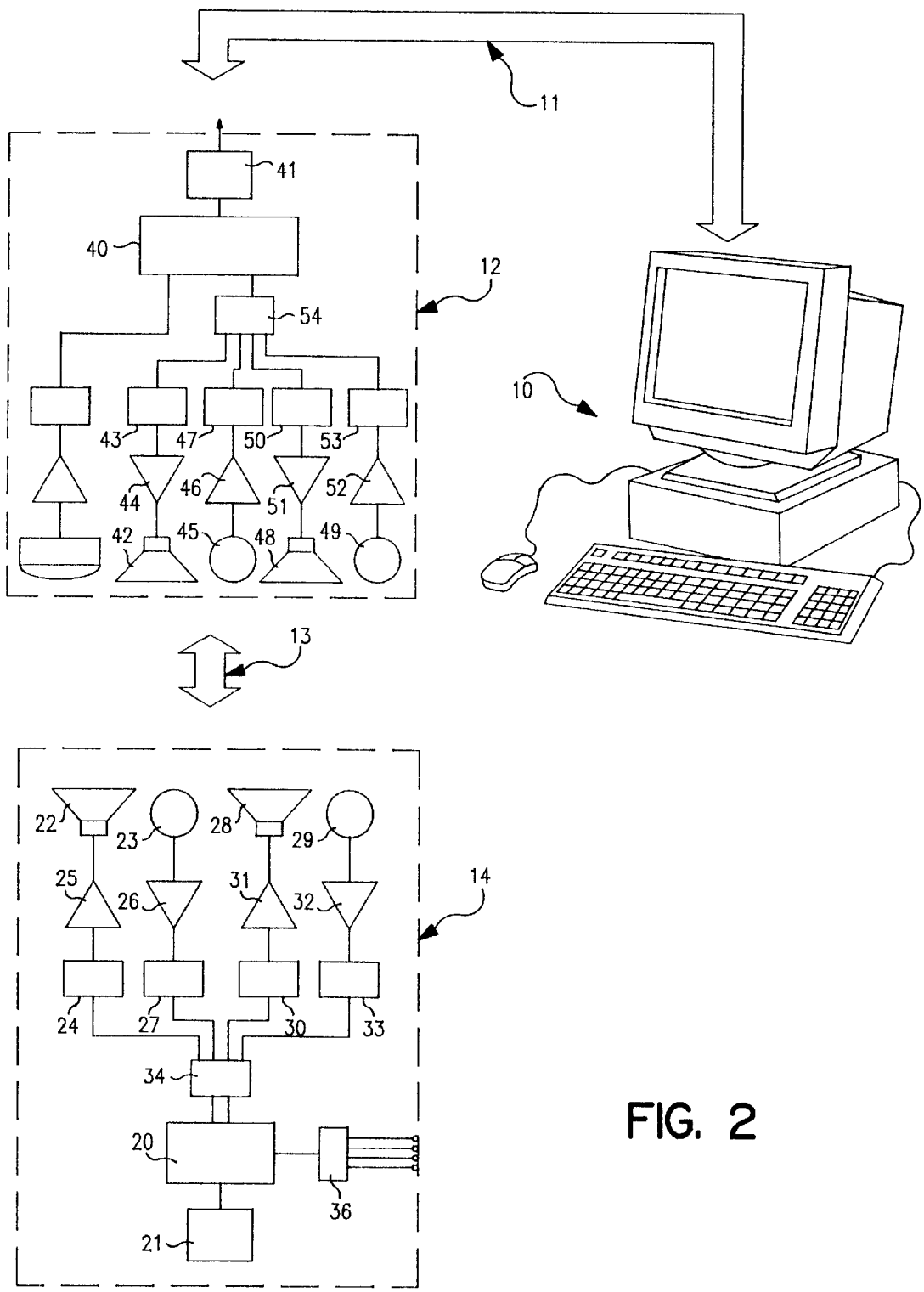
FIG. 2 is a block diagram showing the main elements in the system according to the invention.

The fundamental construction of the total system appears from FIG. 2. The figure shows a central control unit or central unit 10 which, through a network 11, is in both-way communication with a plurality of detectors, here represented by a room detector 12. Each of the detectors is in wireless, both-way communication with the marker chips (!ID chips) of the system. The information is transmitted by frequency modulation. The connection in the figure is designated by 13, whereas the chips are represented by a chip 14. The network 11 connecting the room detectors 12 with the central unit 10, may be of different character. There may be used a separate line system in the form of a two-wire parallel interconnection or star-type network, an existing line system for internal telephone or alarm installation, mains or data network. Different techniques are used for adaptation to the different network solutions.

As mentioned, the signalling between the chips and the room detectors takes place by means of ultrasound or audible sound (audio). As known, the ultrasonic signals have the property that they do not easily penetrate walls and ceilings, as is the case with high-frequency radio waves. This makes it possible to determine the location of the marker chips to concrete rooms or parts of large rooms. The range of ultrasonic signals is of the order of 10–15 m. Larger rooms therefore must have several is detectors.

Essential features of the three main elements of the system, i.e. the chip 14, the room detector 12 and the central unit 10, may be summarized as follows:

The chip 14 is a miniature electronic unit which, by means of ultrasound or sound, can transmit and receive signals within a room. The chips have individual identification codes. The chips may have inputs and outputs in order to be able to check the condition (e.g. the operating time) of objects to which they are fastened.

The room detector 12 is a unit which, by means of ultrasound or sound, can transmit and receive signals to and from chips in the same room. The room detector can transmit and receive signals to and from the central unit and/or from a possible subcentral. In addition, the room detector can have other types of sensors or detectors for detecting movement or other incidents in the room.

The central unit 10 communicates with all the detectors via a network where also subcentrals may be arranged. The central unit receives information from chips and from room detectors. The central unit processes received information from chips and prestored information relating to the authorization of the chips, and generates alarms and warnings according to predetermined criteria.

As shown in FIG. 2, the central unit 10 may consist of a PC equipped with software which is especially developed for the purpose and is very flexible with respect to adaptation of functions in the system to the different fields of application.

Figure 3:
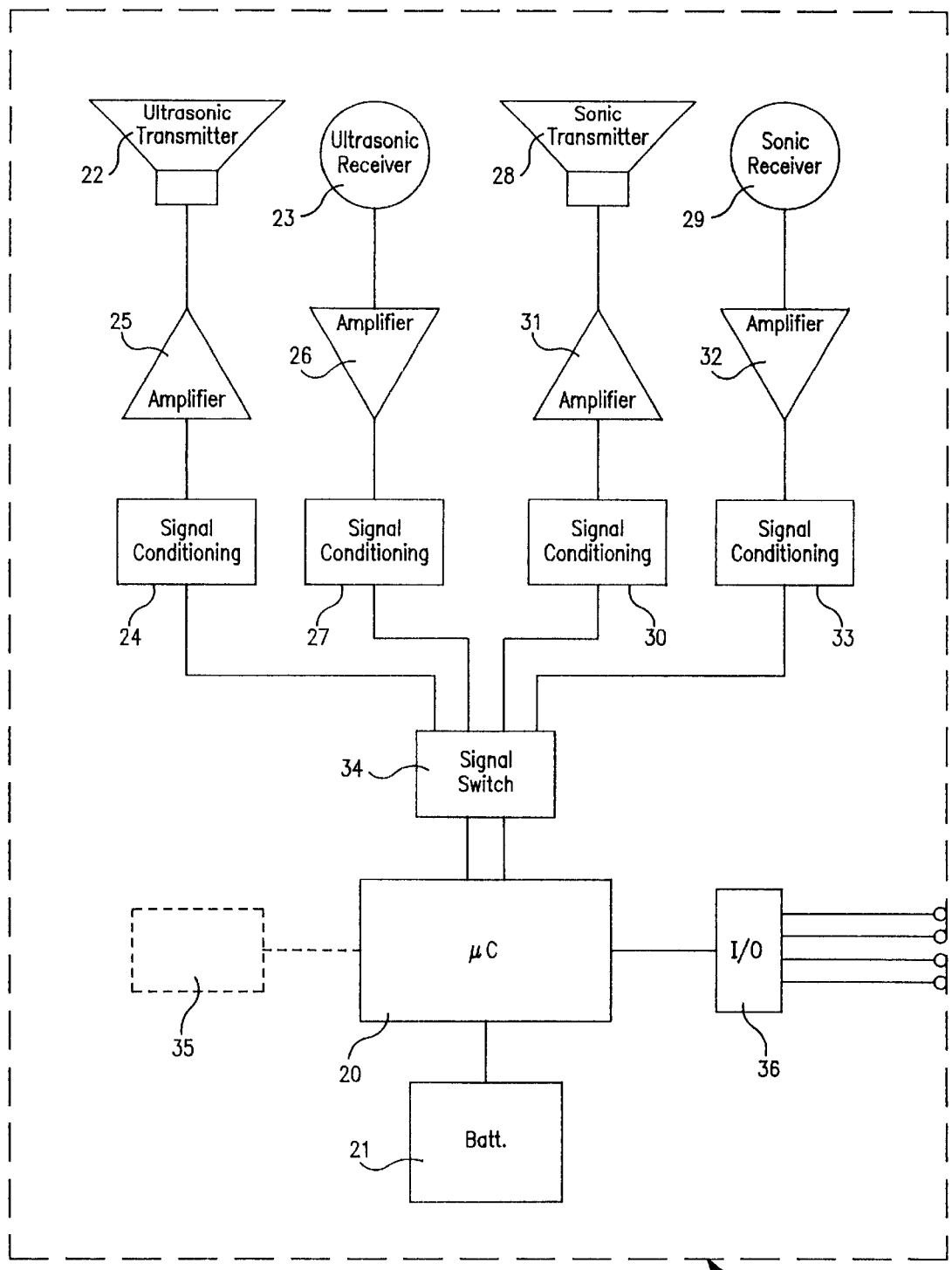
FIG. 3 shows an example of the construction of an ID chip in the system according to the invention.

An example of the construction of a marker chip or ID chip 14 is shown in FIG. 3. The chip comprises a control circuit in the form of a microcontroller ($\mu$C) 20 controlling the different operations of the chip. Power supply to the $\mu$C circuit 20 and to the remaining circuits of the chip is provided from a battery 21. The chip communicates with the room detectors 12 via an ultrasonic transmitter (US transmitter) 22 and an ultrasonic receiver (US receiver) 23. Digital signals from the $\mu$C circuit 20 is supplied to the US transmitter 22 via a signal conditioning circuit (D/A converter) 24 and an amplifier 25, whereas analogue signals from the US receiver 23 is supplied to the $\mu$C circuit via an amplifier 26 and a signal conditioning circuit (A/D converter) 27. The chip 14 further communicates with the room detector 12 via a sonic or audio transmitter (AUD transmitter) 28 and a sonic or audio receiver (AUD receiver) 29. Digital signals from the $\mu$C circuit 20 are supplied to the audio transmitter 28 via a signal conditioning circuit 30 and an amplifier 31, whereas analogue signals from the audio receiver 29 are supplied to the $\mu$C circuit via an amplifier 32 and a signal conditioning circuit 33.

The chip 14 further contains a signal switching circuit 34 for switching between ultrasonic and audio signalling, and which is in the form of a switch or selector (time multiplexer) controlled by the $\mu$C circuit 20, so that the selector 34 provides for switching between audio and ultrasound at chosen time intervals. This change-over or switching will be further described below.

The microcontroller 20 of the chip operates as a state machine having several states, wherein it alternates between listening to the ultrasonic receiver 23 for a short time (100–200 ms) within a time interval of ½ second, and to the audio receiver 29 for a similar short time within an interval of ½ second. The microcontroller controls the alternation by means of a built-in timer and the selector 34. The timer gives time-out after ½ second, and switches the selector. If the chip receives a valid signal while it is in the listening states, and this is a valid message, and the message ask for the identity of the chip, the state machine of the $\mu$C circuit will pass on to the transmitting mode. The chip then will transmit in the same frequency band as the received, valid ultrasonic or audio message, and respond with a predefined message to the detector 12. Immediately after the response has been delivered, the $\mu$C circuit 20 passes from the transmitting state back to the listening state according to the same alternating pattern as that described above.

The chip normally is in the listening mode, and only passes on to the transmitting mode when there is transmitted. The chip immediately goes back to the listening mode. If it is the question of a chip having inputs from external equipment (see below) or a chip which for some reason is to transmit information uninvitedly to the detector, the state machine of the $\mu$C circuit will pass from the listening state to the transmitting state, and the signal selector 34 will choose the ultrasonic transmitter 28 as the source. The $\mu$C circuit 20 will transmit information via ultrasound, and thereafter will change state to the listening mode. At the same time a built-in timer in the $\mu$C circuit will start, and measure the time from transmission until a response is received from the detector. If the transmission is answered from the detector in the form of an ultrasonic acknowledgement message for received message, the timer stops and the chip remains in the listening mode. If no such acknowledgement message comes from the detector, the chip will transmit the message anew a predetermined number of times, and if this does not result in a response message from the detector, the microcontroller of the chip will change state to transmit (and receive) on the audible frequency band. This takes place in that the microcontroller switches the signal selector 34 to activate the audio transmitter 28 and the audio receiver 29. Immediately after transmission, the chip goes to the listening state, and if the chip receives an acknowledgement for the message, the state machine will go back to the listening state.

The microcontroller 20 contains a memory (EEPROM) which is arranged for remote programming, addressing and processing. The memory can store the current desirable data, e.g. also histories as to where the object to which the chip is fastened, has been in a certain time period. The memory also contains the special, preprogrammed identification code of the chip. The chip is arranged for automatic activation at predetermined time intervals, and for then to transmit a message comprising the special identification code. The activation can take place directly from the chip by means of the control circuit 20, or from the central control unit (PC) 10 after a time period programmed in advance. The chip also can be arranged for automatic activation when the battery 21 is to be changed. This ensures that the chips in the system always have sufficient current supply for correct function.

The chips suitably may be preprogrammed from a local or central computer while they are out in the system. This may be desirable if one wants to change the time period in which a supervised object is out in the system. Thereby much time can be saved in that one is let off taking in objects manually for reprogramming.

As shown in FIG. 3, the chip 14 possibly may be provided with a signal transmitter 35, such as a buzzer, which is arranged to deliver a signal in case of an alarm which has been triggered by a neighbouring detector. This may represent an advantageous safety measure, since an authorized person, carrying the chip with the signal transmitter, then will get an indication that an unauthorized person, which may be an intruder or a burglar, is in the same security zone.

Further, as shown in FIG. 3, some chips may be provided with an input/output unit (I/O unit) 36 having ports for reception and delivery of information concerning service life or active operating time of respective objects or apparatuses on which the chips are mounted.

Figure 4:
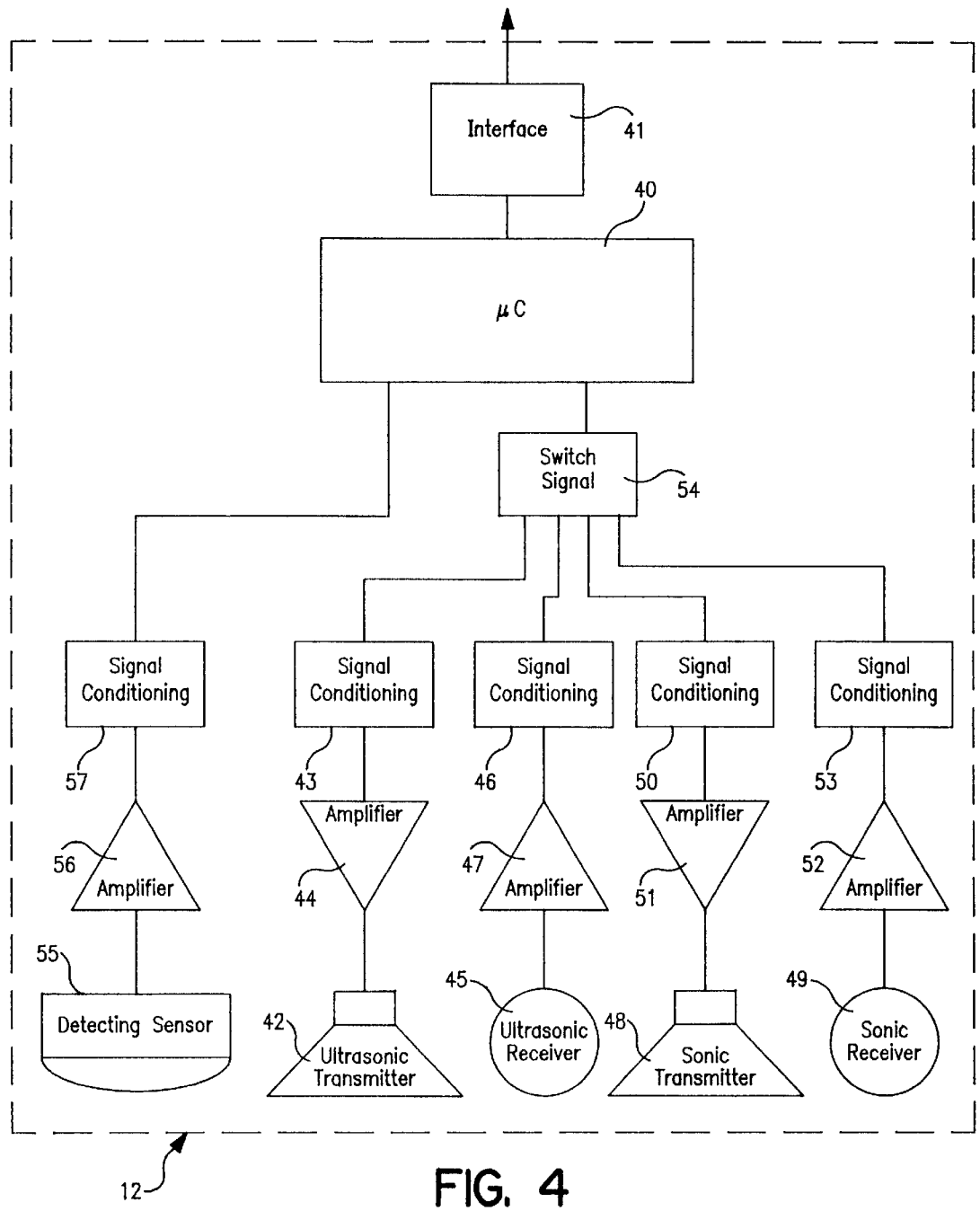
FIG. 4 shows an example of the construction of a room detector in the system according to the invention.

An example of the construction of a room detector 12 is shown in FIG. 4. In a similar manner as the chips 14, each of the detectors comprises a control circuit in the form of a microcontroller ($\mu$C) 40 controlling the different operations of the detector, and which contains a memory (EEPROM) for remote programming, addressing and processing. The control circuit 40 communicates with the network 11 via an interface or modem 41 which is adapted to the chosen network technology. As mentioned above, the network 11 may be 1) a separate network which is especially adapted to the system, 2) a network for an existing alarm or calling installation, 3) the mains (110/220/380 V), or 4) a PC network. For communication with the chips 14, the control circuit 40 further is in connection with an ultrasonic transmitter (US transmitter) 42 via a signal adapter (D/A converter) 43 and an amplifier 44, and in connection with an ultrasonic receiver (US receiver) 45 via a signal adapter (A/D converter) 46 and an amplifier 47. The detector 12 further communicates with the chips 14 via an audio transmitter (AUD transmitter) 48 and an audio receiver (AUD receiver) 49. Digital signals from the $\mu$C circuit 40 are supplied to the audio transmitter 48 via a signal conditioning circuit 50 and an amplifier 51, whereas analogue signals from the audio receiver 49 are supplied to the $\mu$C circuit via an amplifier 52 and a signal conditioning circuit 53.

In a similar manner as the chips 14, the detector 12 contains a signal switching circuit 54 in the form of a selector controlled by the $\mu$C circuit 40, so that the selector 54 provides for switching between audio and ultrasonic communication at chosen time intervals. This switching will be further described below.

During normal retrieval, the central unit 10 controls the calling of a chip 14. This takes place in that the central unit sends a message to the detector 12 about the frequency on which there is to be signalled, together with the identity of the chip which is sought. The detector receiving the message then will process the message, and the $\mu$C circuit 40 chooses. signalling medium in the signal selector 54. This takes place in that a state machine enters the initial stage, and the message always will be firstly sent ultrasonically. The beginning of the message will be without data, but is a continuous awakening signal to the chip. After this the message follows. When the message has been sent, the detector will pass on to the listening mode and wait for a response from a chip. The response is expected from the chip in the same frequency range as that of the transmitted signal. If the detector does not receive a response after a period of one second, a built-in timer in the microcontroller will give time-out, and send a message about this back to the central unit. The central unit may choose to try transmission a number of repeated times by sending the same message to the detector the same number of times, or to send a new message where the detector is commanded to signal on audible frequencies. This takes place in that the state machine in the detector changes state to send via audio, whereafter the signal selector 40 is switched to activate the audio transmitter 48 and the audio receiver 49. The same time-out protocol as for ultrasound applies also here.

The room detector 12 further comprises a detecting sensor 55 which is connected to the control circuit 40 via an amplifier 56 and a signal conditioning circuit (A/D converter) 57. The sensor 55 is arranged to detect movements or rather incidents in the room, and is based on commonly known technology (ultrasound, infrared radiation, etc.).

As a result of the fact that the detectors 12 are addressable, and further contain both a transmitter and a receiver and are connected in a network, the rooms in which the current persons/objects (with ID or marker chips) are situated, can easily be identified by means of a local or central computer.

The central unit 10 comprises a processor containing a data base with information about all the chips in the system. The following information about the chips will be entered into the data base:
function (mode),
identification,
authorized mode,
non-authorized mode,
description (e.g. name of person or type or number of an instrument, e.g. an infusion pump or a medical journal in a hospital),
different alarm levels to be activated in case of violation of authorization.

The main functions of the central unit may be summed up in 1) controlling functions, 2) listening functions and 3) checking functions. These main functions essentially comprise the following operations:
The controlling functions of the central unit:
Controlling the room detectors to set themselves in different modes adapted to the requirement where the detector is placed.
Transmit a general call via room detectors to chips that are to be found.
Automatically transmit a call to object marker chips to be checked whether they are present where they are to be.

Transmit information to definite chips about the mode in which they are to place themselves (different fields of use).

Transmit information to chips about a change of identification code if this is desirable (safety measure and administrative maintenance).

The listening functions of the central unit:

Receive messages from room detectors which have received a response or data from ID or marker chips.

Receive messages from room detectors which have detected persons that are present in a definite zone.

Receive acknowledgements of commands which have been sent out.

Receive signals from other types of detectors, such as photocells, IR detectors, door switches, manually released signals and a possibly existing conventional alarm system.

The checking functions of the central unit:

Compare received signals with the data base to verify the authorization of the chip.

Give an alarm in cases where data from chips do not correspond with the valid states with which they are equipped.

Log the location of chips to be followed at any time.

Interpret signals from room detectors detecting movement in a zone, and sum up this against incoming data from chips in the zone. Give an alarm if unauthorized movement is registered.

Interpret data from other detectors (photocells etc.) and sum up this against incoming data from chips in the zone. Give an alarm if unauthorized movement is interpreted in the zone.

Catalogue information in the data base about chips which are continuously supervised.

The transmitters and receivers used in the chips, and possibly also in the detectors, in the system according to the invention suitably comprise electroacoustic transducers based on piezoelectric film of polyvinylidene fluoride (PVDF film). This technique is advantageous in that it enables miniaturizing and economic manufacture of marker chips which are fit for placing on e.g. the back portion of patient journals. Such transducers can be used both in the audible frequency range and in the ultrasonic range, and they can be used both as loudspeakers and as microphones in the sound-based data connection between the chips and the detectors.

Acoustic radiation from a transducer requires volume excursion. As the relevant film thickness in this connection is of the order of 10 $\mu$m, the film will be too thin to achieve a sufficient volume excursion by means of thickness variations of the film. Therefore, one must make use of area changes of the film. In order to transform area changes to volume changes, the film must be curved in a preferably circular curve and clamped at opposite side edges of the film. By applying an alternating voltage to a pair of electrodes covering the two sides of the film, there is then achieved a pulsating movement transversely to the film. Because of the small thickness, the film will have a minimal bending stiffness. Therefore, it must be prestressed with a mechanical spring force, fixed in a curved frame or be made self-supporting in that several film layers are glued together. This applies both to sound transmitters and to microphones.

For the applications of interest here, it may be advantageous to utilize two basic geometries, viz. 1) a piezo-electric film stretched over a curved supporting material, and 2) a self-supporting curved diaphragm. The first-mentioned design can be used both as a sound transmitter and a microphone, whereas the latter is most suitable as a microphone.

Figure 5:
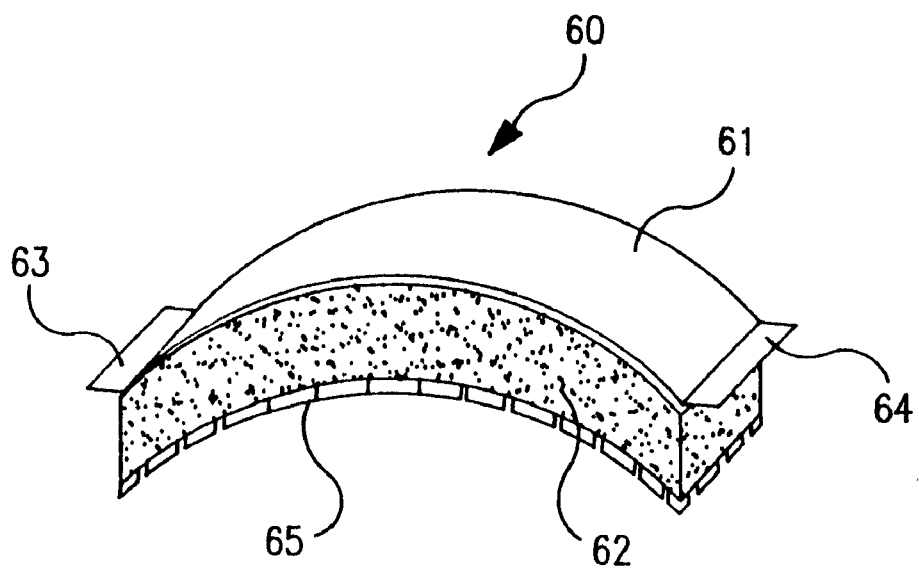
FIG. 5 shows a schematic perspective view of an embodiment of an electroacoustic transducer used in the transmitters and receivers of a chip.
Figure 6:
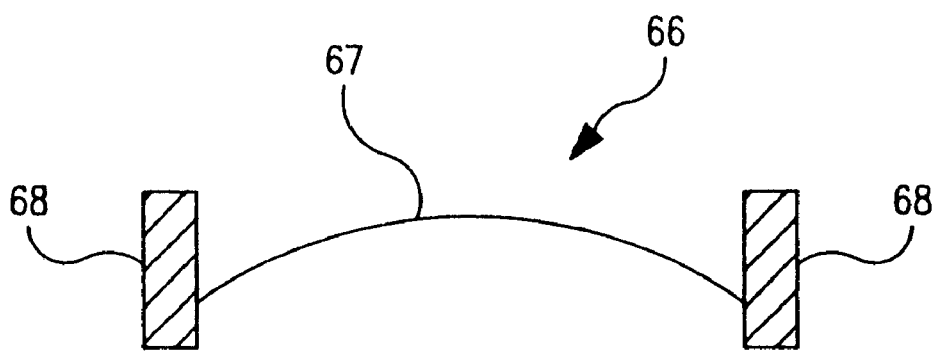
FIG. 6 shows a schematic cross-section of another embodiment of an electroacoustic transducer which may be used in the receivers.

Two embodiments of such electroacoustic transducers are schematically shown in FIGS. 5 and 6. Thus, FIG. 5 shows an embodiment of a transducer 60 of the first-mentioned geometry, wherein a rectangular piece 61 of a PVDF film is stretched in the orientation direction over a flexible supporting material 62 which is circularly curved in cross-section and is fixed at the end edges 63, 64 where the associated line wires (not shown) are attached in a suitable manner, for example by glueing. The flexible supporting material 62 is in turn supported by a rigid support plate 65. The curvature of the film may vary and will be one of the factors in optimalization with respect to sensitivity, frequency response and linearity. The film suitably has a thickness of about 10 $\mu$m, and the radius of curvature and angle of curvature of the film will be optimized in dependence on the thickness and area of the film and the relevant operating frequency range.

Advantages of the embodiment according to FIG. 5 are that it has a relatively simple construction and is relatively robust, and that it may be manufactured with a good sensitivity. Critical factors for the properties of the transducer will be the quality of the supporting material, and that a stable, resilient prestressing of the film is required.

A transducer embodiment according to the second basic geometry is suggested in FIG. 6. The figure shows a transducer 66 comprising a PVDF film which is shaped as a self-supporting diaphragm 67 which is fixed in a frame or a housing 68. The self-supporting diaphragm 67 is formed by joining several layers of film. For a sound transmitter the thickness of each layer for considerations of sensitivity should not be thicker than 5–10 $\mu$m. The sensitivity in principle is independent of the number of layers. The layers must be connected in parallel, and in practice this may be obtained by folding a film strip many times. Parallel connection gives a low impedance (high capacitance).

For microphones the sensitivity is independent of the thickness of the film, and generally there may be used a film with such a thickness that one layer will be self-supporting. If several layers are used, these must be connected in series. The internal impedance will be proportional to the thickness.

Advantages of the embodiment according to FIG. 6 are that it has a relatively good sensitivity and is relatively robust, and further that it is independent of supporting material, and therefore must be supposed to have a good long term stability.

Critical data for optimum sound pressure with a coverage angle of 120° for ultrasound and 180° for audio, are stated both for sound transmitters and microphones in the table below.

| Description | Microphone ultrasound | Sound transmitter ultrasound | Microphone audio | Sound transmitter audio |
|---|---|---|---|---|
| Film thickness | 10 $\mu$m | 10 $\mu$m | 100 $\mu$m | 10 $\mu$m |
| Angle of curvature | 20° | 20° | 60° | 60° |
| Operating frequency | 25 kHz | 25 kHz | 5 kHz | 5 kHz |
| Area of film | 10 × 10 mm | 10 × 10 mm | 10 × 30 mm | 10 × 30 mm |

As appears from the preceding description, the system according to the invention combines two main functions:

1. An alarm system which is always active, but which fails to give an alarm in case of authorized activity in the supervised area.

2. Automatic decision of location, identification and state of electronic marker chips placed on objects, in connection with e.g. service on equipment which is to be taken in for routine maintenance/control. In the same manner the system may be used for localization, identification and authorization of persons, or when the chip ceases to send signals.

The main processes carried out by the present system are 1) Access control, 2) Object control and 3) Active message from ID chip. A survey of functions and operations forming part of said main processes are given below.

Access Control
ID Chip (Marker Chip) in Normal Mode
  US transmitter is passive.
  US receiver listens continuously for commands from the room detectors.
  The chip responds only to a call by transmitting its identification code via the US or audio transmitter.
  The ID chip possibly transmits command and identification if the chip is programmed to make itself known according to special criteria (Object control).
Room Detector in Normal State of Rest
  US or audio receiver always listens.
  US or sound transmitter is passive until the central gives a message about a call.
  Detecting sensor is always active and forwards continuous messages to the central about all movements in the room and cessation of signals.
Rom Detector in Detecting State
  Detecting sensor detects movement in the room and sends a message to the central via the network that activity has been registered, and wherefrom the registration comes.
  The central sends a message to the relevant room detector (and only this) to make a call via ultrasound or audio in the room and to ask the present ID chip to answer with its identification code.
  The ID chip answers with its ID code.
  The room detector receives the answer of the ID chip and transmits the answer via the network to the central.
  The central receives the answer and compares this with information about authorized access. In case of unauthorized access an alarm is given. In case of authorized access no reaction takes place.
  The process goes on continuously at short time intervals as long as movement is registered in the room, so that one or more new ID chips are checked.
Object Control
Quiescent Mode
  Room detector is in the same mode as for Access control.
  The ID chip is normally passive and in listening mode.
Tracking of Object
  The central transmits a general calling over the network to all room detectors, to call the ID chip or chips which is/are wanted.
  All room detectors send out an ultrasonic or audio call in all rooms for the desired ID chip of chips.
  All ID chips listen for the call, but only the chip/chips recognizing its/their code, answers/answer.
  The room detector receiving the answer, sends a message to the central about its registration, and the location or site of the ID chip thereby is known.
Active Message from ID Chip
  An ID chip can be programmed to make itself known according to preprogrammed criteria. It may be time, number of registered incidents or presences on a non-authorized location.
State of Rest
  The ID chip is passive and only listens.
Active Calling from the ID Chip
  The ID chip triggers itself to make itself known by transmitting its code and a command to the nearest room detector with a message to forward a message to the central about its location.
  The central sums up the automatic calling with stored information about the chip and gives a message/alarm in accordance therewith.
Updating
  The central calls chips in this category on a routine basis to check that they are present where they belong. If a chip answers from a place where it is not permitted to be, there may be given an alarm/message at the central. If a chip does not respond to ultrasound, the chip will be called by sound. It there is not given any answer on these calling signals, an alarm may be given at the central.
Answer from ID Chip
  It may occur that several ID chips are asked to answer simultaneously. Two chips which are transmitting at the same time, will disturb each other and the signal will not be readable from any of these. To avoid this problem, the chips emit their data pulse trains repeatedly at random intervals. The chips will then finally find a free time slot wherein the signal is alone and will be detected by the room detector.

Figure 7:
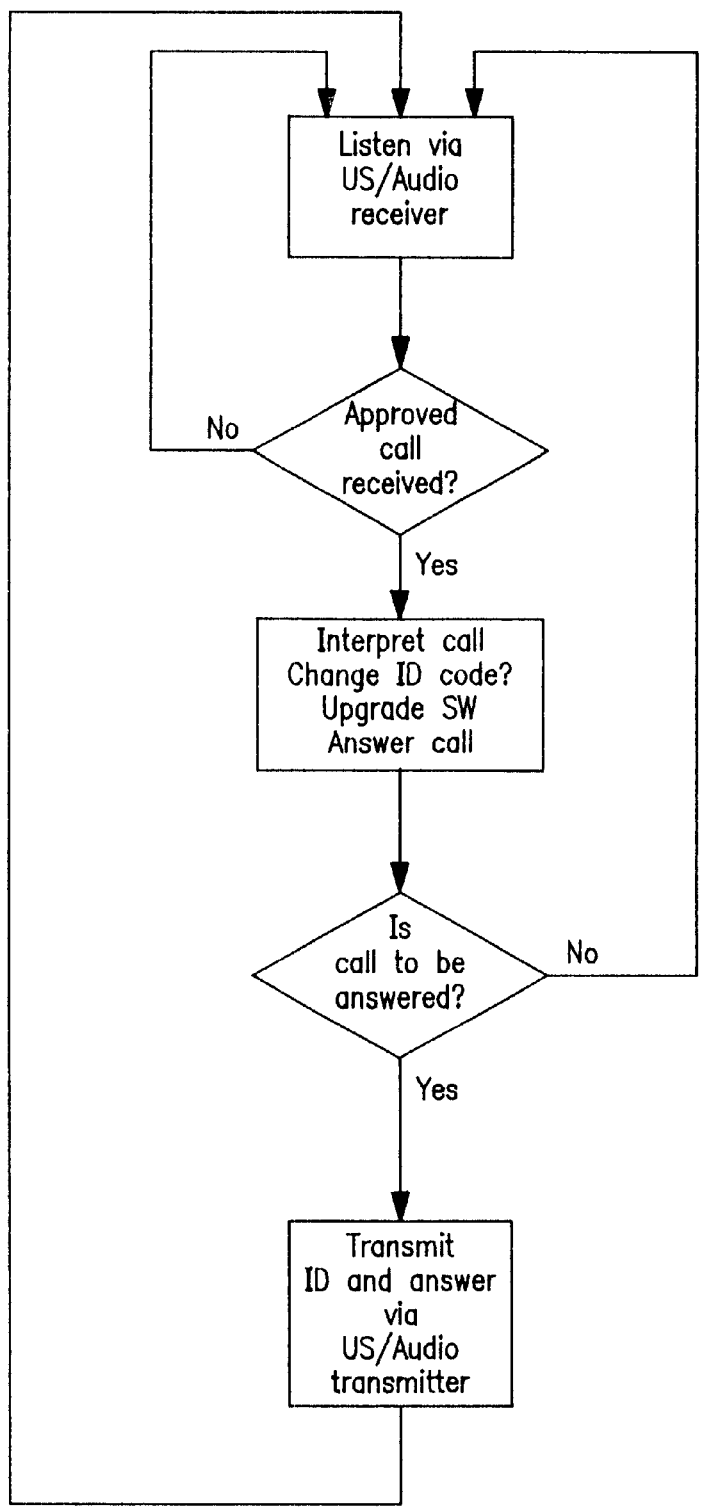
FIG. 7 is a flowchart showing operating steps carried out in a chip.
Figure 8:
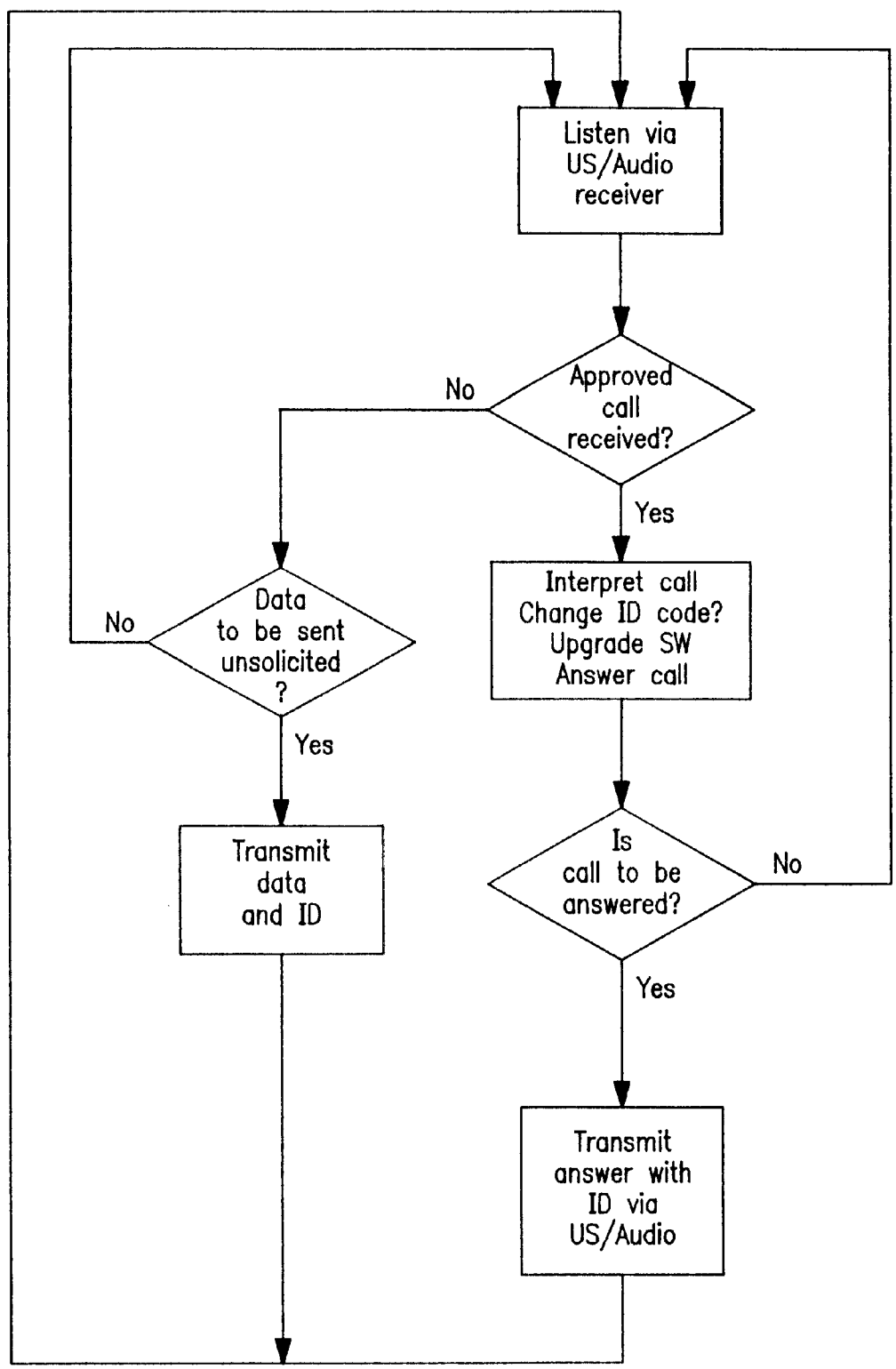
FIG. 8 shows a flowchart corresponding to that of FIG. 7, for a chip which is provided with inputs and outputs for operational data from an object on which the chip is mounted.
Figure 9:
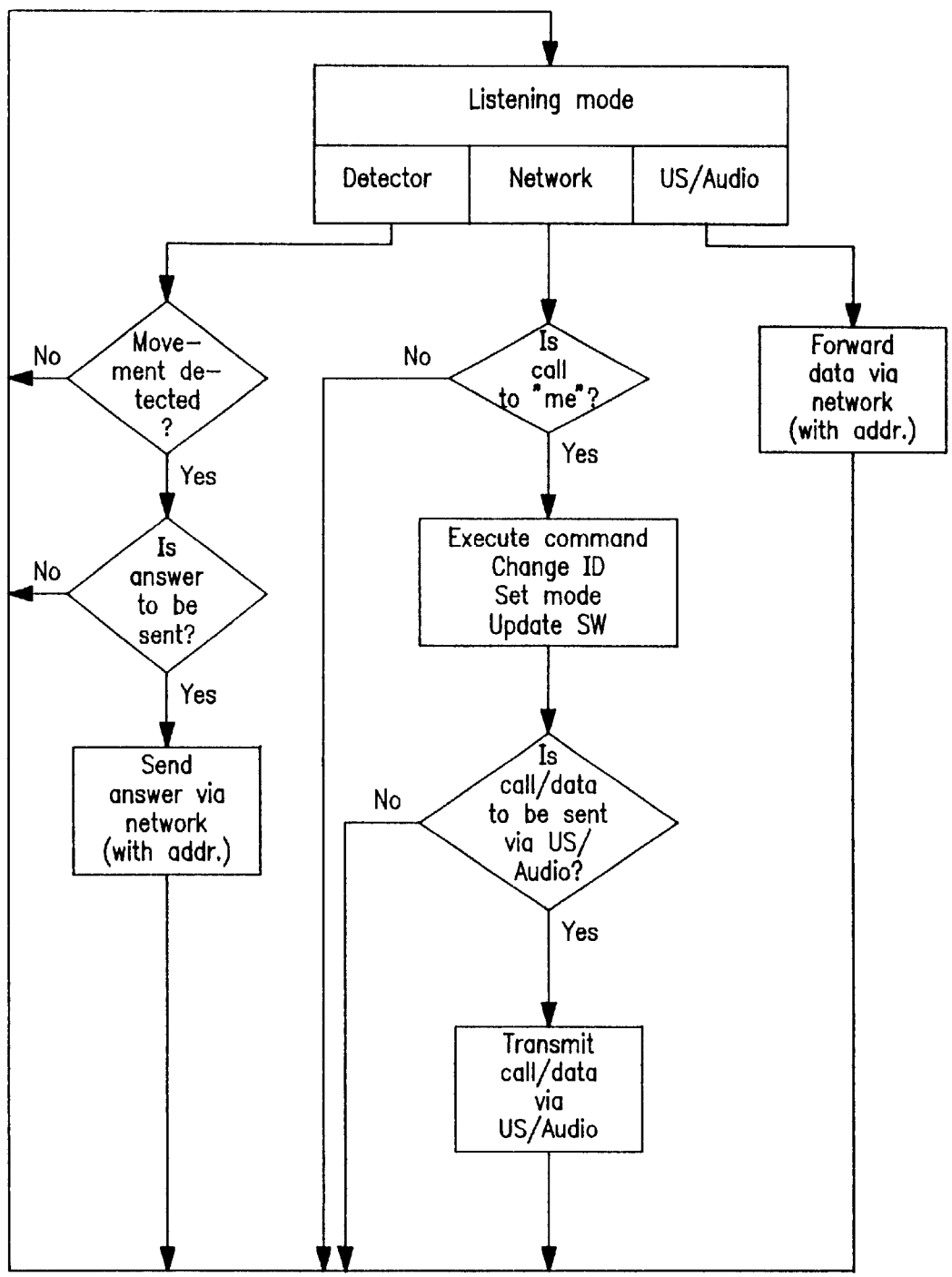
FIG. 9 is a flowchart showing operating steps carried out in a room detector.

Flowcharts illustrating operations carried out in the chips and in the room detectors, are shown in FIGS. 7–9. Thus, the flowchart in FIG. 7 shows operations carried out in a chip in the previously discussed, normal mode in which the US receiver listens continuously for commands from the room detectors. FIG. 8 shows a corresponding flowchart to that of FIG. 7, but also additional operations carried out in a chip provided with an I/O unit 36 for transmission of operating data. Finally, the flowchart in FIG. 9 shows operating steps carried out in a room detector in the detecting state.

What is claimed is:

1. A system for supervision and control of objects or persons within a limited area, comprising a plurality of electronic identification chips for placing on respective objects/persons to be supervised/controlled, each chip having stored a special ID code and being provided with a transmitter and a receiver for communication via ultrasound, a plurality of stationary detectors interconnected in a network and arranged for both-way communication with the chips, and a central control unit communicating with the chips via the detectors, wherein each chip and each detector also is provided with a transmitter and a receiver for communication via audible sound (audio), a means being provided for switching between ultrasonic and audio communication, and that each chip in operation is continuously active and is arranged to transmit its ID code at predetermined time intervals, at least one of the detectors or the control unit being arranged to trigger an alarm unit if an incorrect code is received or an approved code is not received continuously at chosen time intervals.

2. A system according to claim 1, wherein selected, special chips, are provided with a signal transmitter, which is arranged to deliver a signal in case of an alarm triggered by a neighboring detector.

3. A system according to claim 1, wherein the chips are each programmed with a different gradation, the gradation specifying a larger or smaller part of said limited area to which the chip has access.

4. A system according to claim 1, wherein each of the chips and the detectors contains a switching means in the form of a selector which is arranged to be controlled by a control circuit in the chip or detector in question, so that the selector provides for said switching at chosen time intervals.

5. A system according to claim 1, wherein the transmitters and receivers in the chips comprise electroacoustic transducers in the form of a piezoelectric film of polyvinylidene fluoride (PVDF), wherein the film is mounted in a curved shape with a suitable angle of curvature which is optimized in dependence on the thickness and area of the film and the relevant operating frequency range.

6. A system according to claim 5, wherein the PVDF film has a thickness of about 10 $\mu$m and is supported in a circular-cylindrically curved shape by a flexible supporting material which is supported by a rigid support plate.

7. A system according to claim 5, wherein the PVDF film is formed as a self-supporting diaphragm.

8. A system for supervision and control of objects or persons within a limited area, comprising a plurality of electronic identification chips for placing on respective objects/persons to be supervised/controlled, each chip having stored a special ID code and being provided with a transmitter and a receiver for communication via ultrasound, a plurality of stationary detectors interconnected in a network and arranged for both-way communication with the chips, and a central control unit communicating with the chips via the detectors, wherein each chip and each detector also is provided with a transmitter and a receiver for communication via audible sound (audio), a means being provided for switching between ultrasonic and audio communication, and that the central control unit is arranged to selectively call a selected chip via the detectors, and that the chips are arranged to give an answer as a reaction to the call, the closest situated detector then identifying the site/locality of the chip.

9. A system according to claim 8, wherein the chips are arranged to activate themselves after a preprogrammed time interval, and then to transmit a message to the central control unit.

10. A system according to claim 8, wherein at least one of the chips is provided with at least one input and at least one output for receiving and delivering information concerning service life or active operating time of respective objects on which the chips are mounted.

11. A system according to claim 8, wherein each of the chips and the detectors contains a switching means in the form of a selector which is arranged to be controlled by a control circuit in the chip or detector in question, so that the selector provides for said switching at chosen time intervals.

12. A system according to claim 8, wherein the transmitters and receivers in the chips comprise electroacoustic transducers in the form of a piezoelectric film of polyvinylidene fluoride (PVDF), wherein the film is mounted in a curved shape with a suitable angle of curvature which is optimized in dependence on the thickness and area of the film and the relevant operating frequency range.

13. A system according to claim 12, wherein the PVDF film has a thickness of about 10 $\mu$m and is supported in a circular-cylindrically curved shape by a flexible supporting material which is supported by a rigid support plate.

14. A system according to claim 12, wherein the PVDF film is formed as a self-supporting diaphragm.

* * * * *